Figure 2:
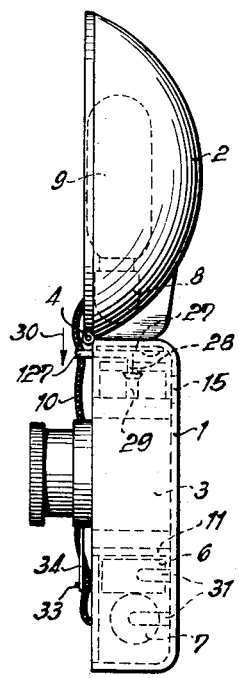

Feb. 3, 1959   W. H. VAN DER MEI   2,871,775
FLASHLAMP DEVICE FOR PHOTOGRAPHIC CAMERAS
Filed Feb. 16, 1955

2,871,775

FLASHLAMP DEVICE FOR PHOTOGRAPHIC CAMERAS

Wietse Hendrik van der Mei, Apeldoorn, Netherlands, assignor to Voigtlander A. G., Braunschweig, Germany, a corporation of Germany Application February 16, 1955, Serial No. 488,598

2 Claims. (Cl. 95—11.5)

This invention relates to flashlight devices for photographic cameras and has particular relation to devices of this type which contain a reflector and a part for carrying the camera, said reflector and said part being connected with each other by means of hinges.

In a known type of photographic flashlight devices the reflector and the casing for carrying the electric parts, i. e. the battery, condenser, and their switching elements, are connected by a hinge, so that the casing which houses said electric parts can be clapped, when not in use, into the hollow interior of the reflector, thereby reducing the dimensions of the device. It has also been known to movably or rigidly connect in a flashlight device the casing for carrying the electric parts with another part, to which a photographic camera can be fastened. Thereby, the casing and said part for carrying the camera are of rectangular design and of such size that both are partially covered by the reflector when the latter is clapped to them in its rest position.

In order to use the flashlight device and the camera, the reflector must be swung aside from the casing and the part which carries the camera. Simultaneously, by swinging out the casing for carrying the electric parts, from the member carrying the camera, the operating elements (such as view finder, shutter release, film control member etc.) of the camera, must be rendered accessible. However, this type of handling, as well as the construction of the total device of several parts, have been found to be disadvantageous.

The photographic flashlight device embodying the present invention consists likewise of a reflector provided with a lamp socket, of a casing for housing the electric parts (i. e. battery and condenser) and a part carrying the camera, whereby these parts are connected with each other by a hinge in such manner that the reflector can be swung to the part carrying the camera. According to the present invention, the lower flashlight device part for housing the camera consists of a single structural part which can be completely covered by the reflector in folded position of the latter. This construction results in simple handling and at the same time in small dimensions of the total device. The design according to the invention is particularly suitable for manufacture from moldable plastic materials, e. g. polyamides.

Another feature of the invention consists in that the casing for carrying the electric parts of the flashlight device is firmly connected with the reflector.

However, according to a modified embodiment of the invention, the electric parts can be accommodated also in a hollow space of the member which houses the camera.

According to a further feature of the invention, the part of the device which houses the camera, is provided on its rear side with an opening, the position and size of which is selected in such manner that use of the camera view-finder is rendered possible.

A further feature of the invention consists in the arrangement of a leaf spring in the part for housing the camera, in such manner that the shutter release member can be actuated by said spring, or by an angle piece fastened thereto.

Another step in carrying out the invention consists in the arrangement of a tiltable or swingable holding device for the camera, in the part of the device, which houses the camera. By such arrangement the camera can be swung or tilted from said part of the device, in order to carry out control movements or adjustments in the camera.

In view of its construction, the flashlight device of the invention can be combined with various camera types.

The appended drawings illustrate by way of example some embodiments of the invention, to which the invention is not limited.

Figure 1:
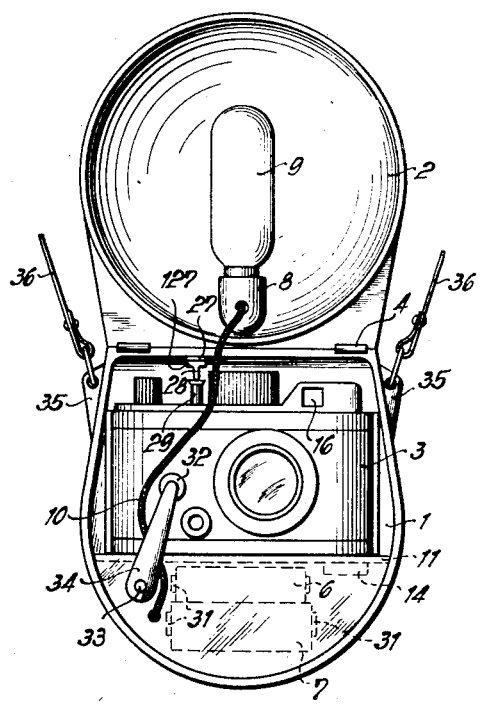

In the drawings, Figure 1 illustrates the flashlight device in open condition in front view; and Fig. 2 is a side view of the device shown in Fig. 1.

Referring now to the drawings in detail, reference numeral 1 denotes a lower casing part which houses photographic camera 3. This part 1 is a cup-shaped body preferably made of a moldable plastic material. Swingably connected to part 1, by means of hinge 4, is a reflector 2 in such manner that in open condition and in operative position of the flashlight device, reflector 2 is located above camera 3 and points in the direction of picture taking. The reflector 2 is likewise preferably made of a moldable plastic material which is provided with a reflecting surface after molding. In closed condition of the flashlight device, lower part 1 is completely covered by reflector 2.

Lower part 1 of the device is provided with a wall 11, which is provided with an opening at the place where a nut for the supporting stand of the camera to be inserted, is located. Through this opening, a knurled screw 14 can be screwed in the nut, so that in this manner camera 3 can be firmly connected with lower part 1.

The rear wall of said part 1 is provided with an opening 15, at the point opposite to the eyepiece of the camera viewfinder, so that finder 16 can be viewed through said opening 15.

Figures 1 and 2 illustrate a flashlight device for a known camera type, in which transport of the film, setting of the shutter and other control movements are automatically effected after each shutter release, by means of a spring mechanism built-in in the camera. An angle piece 127 which projects from part 1 and is carried by a leaf spring 27 fastened in the casing, is fastened to the wall of part 1, which is turned toward reflector 2, in such manner that angle part 28 comes to rest on shutter release key 29 in the camera. Upon applying pressure, in the direction of arrow 30, to the free end of angle piece 127, which projects from part 1, the shutter of camera 3 is released. At the same time, transport of the film and setting of the shutter are effected, by the spring mechanism of the camera.

The electric parts of the device, i. e. the battery 6 and condenser 7, are held in the free space in part 1, below photographic camera 3, by means of contact springs 31 which bring about the electric connections and serve simultaneously as holding means. The connection to synchro-contact 32 of camera 3 consists of a contact arm 34, which is capable of swinging about pin 33. Cable 10 connects the electric parts with socket 8 for the flash bulb in reflector 2.

Part 1 of the device has lugs 35, 35 to which a carrying strap 36 can be fastened.

It will be understood from the above that this invention is not limited to the specific parts, elements, designs and other details specifically described above and illustrated in the drawings and can be carried out with various

What is claimed is:

1. A container for carrying a photographic camera, a flash-bulb device, a camera and flash-bulb device synchronizing switch and accessory parts for operating said camera and said flash-bulb device, said container comprising a first and a second member, said first member having a recessed surface adapted to house the photographic camera, said second member having a recessed reflector surface and having a flash-bulb holder adapted to hold a flash-bulb centrally of said reflector surface, said second member being hinged to said first member and having a rest position in which said second member mates with said first member and closes and covers said recess in said first member and an open position in which said recessed surfaces face in the same direction, a region in one of said members for receiving said accessory parts, said first member having an aperture in its rear wall employed to permit access to parts of the camera, an angle piece for actuation of the camera shutter, said angle piece having one end resting on the shutter release of the camera and its other end extending to a position readily accessible to the camera operator, circuit connections providing a continuous electric circuit through the accessory parts, the flash-bulb holder and the synchronizing switch and an on-off switch adapted to open and close the electric circuit.

2. A container as claimed in claim 1 in which the first member and the second member consist of a molded synthetic plastic material.

References Cited in the file of this patent

UNITED STATES PATENTS

| | | |
|---|---|---|
| 2,482,248 | Coon | Sept. 20, 1949 |
| 2,697,390 | Kindelberger | Dec. 21, 1954 |
| 2,783,696 | Sewig | Mar. 5, 1957 |

FOREIGN PATENTS

| | | |
|---|---|---|
| 847,247 | Germany | Aug. 21, 1952 |